United States Patent
Kondo et al.

(10) Patent No.: US 6,279,966 B1
(45) Date of Patent: Aug. 28, 2001

(54) CONNECTOR MADE OF RESIN FOR CONNECTING PIPES OF SMALL DIAMETER

(75) Inventors: Hiroaki Kondo, Numazu; Eiji Watanabe, Tagata-gun; Kazumi Fukaya, Mishima, all of (JP)

(73) Assignee: Usui Kokusai Sangyo Kaisha Ltd (JP)

( * ) Notice: Subject to any disclaimer, the term of this patent is extended or adjusted under 35 U.S.C. 154(b) by 0 days.

(21) Appl. No.: 09/325,196

(22) Filed: Jun. 3, 1999

(30) Foreign Application Priority Data

Jun. 5, 1998 (JP) .................................................. 10-173991

(51) Int. Cl.[7] .................................................. F16L 37/086
(52) U.S. Cl. ...................... 285/319; 285/148.19; 285/239
(58) Field of Search ..................................... 285/115, 116, 285/148.19, 319, 921, 239, 55, 1

(56) References Cited

U.S. PATENT DOCUMENTS

| | | | |
|---|---|---|---|
| 790,971 | * | 5/1905 | Nicholls ................................. 285/115 |
| 1,981,777 | * | 11/1934 | Brinkman ............................... 285/116 |
| 2,550,669 | * | 5/1951 | Brickman ............................... 285/115 |
| 2,700,988 | * | 2/1955 | Smisko ................................... 285/115 |
| 2,805,683 | * | 9/1957 | Kennison ................................ 285/115 |
| 3,882,845 | * | 5/1975 | Bucalo ............................... 285/115 X |
| 4,635,972 | * | 1/1987 | Lyall ...................................... 285/242 |
| 4,854,613 | * | 8/1989 | Reece et al. ............................ 285/39 |
| 5,172,940 | * | 12/1992 | Usui et al. .............................. 285/31 |
| 5,890,749 | * | 4/1999 | Fukaya et al. ........................ 285/319 |
| 6,129,393 | * | 10/2000 | Kudama et al. ...................... 285/319 |
| 6,155,612 | * | 12/2000 | Szabo .................................... 285/319 |

FOREIGN PATENT DOCUMENTS

2312263 * 10/1997 (GB) .

* cited by examiner

Primary Examiner—Teri Pham Luu
(74) Attorney, Agent, or Firm—Anthony J. Casella; Gerald E. Hespos

(57) ABSTRACT

A connector is provided for connecting a conductive resin tube to a metal pipe. The connector includes a front end for insertion into the conductive resin tube and a rear end defining a chamber for accommodating an end of the metal pipe. A support member is disposed in the connector for supporting the front end of the resin connector. The support member has a front end that engages the inner surface of conductive resin tube and a rear end that engages the metal pipe.

10 Claims, 11 Drawing Sheets

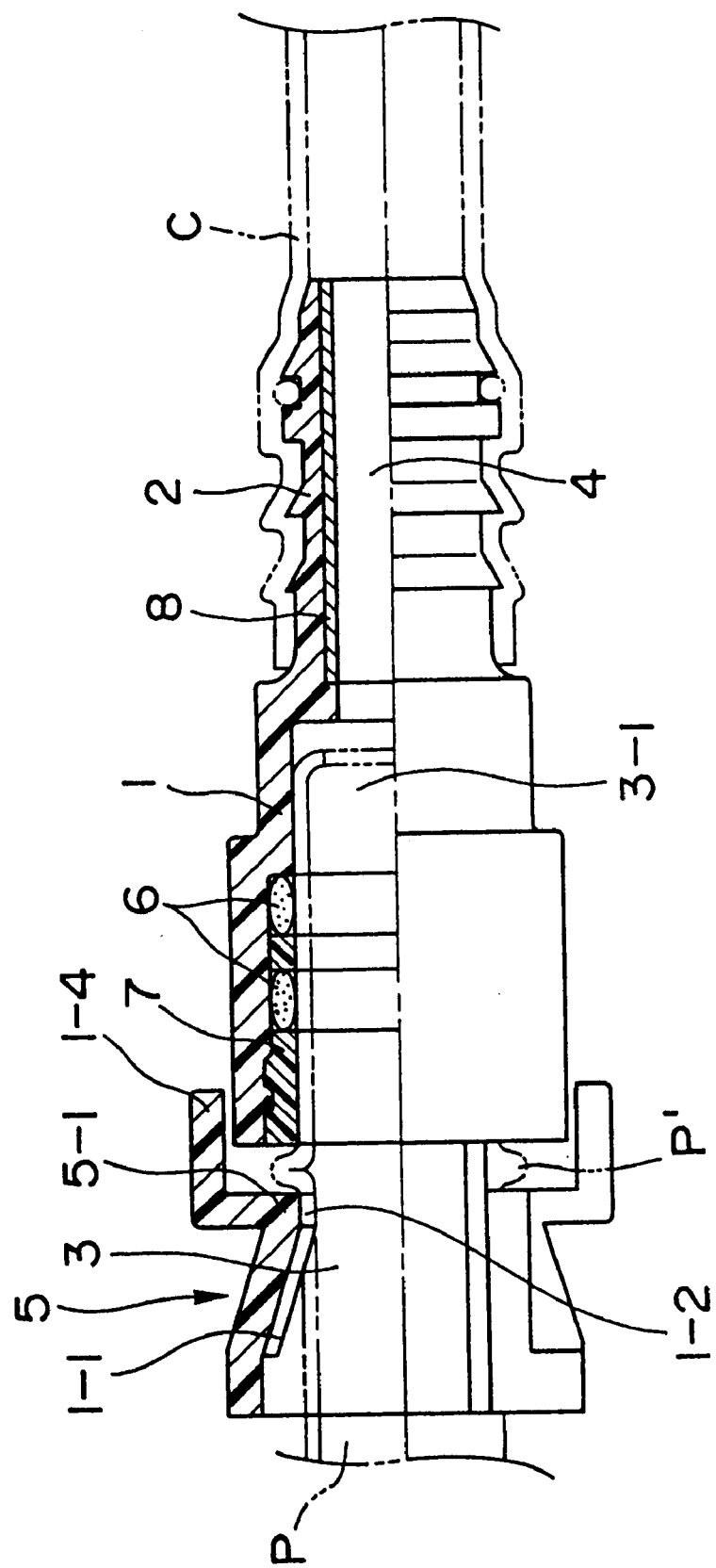

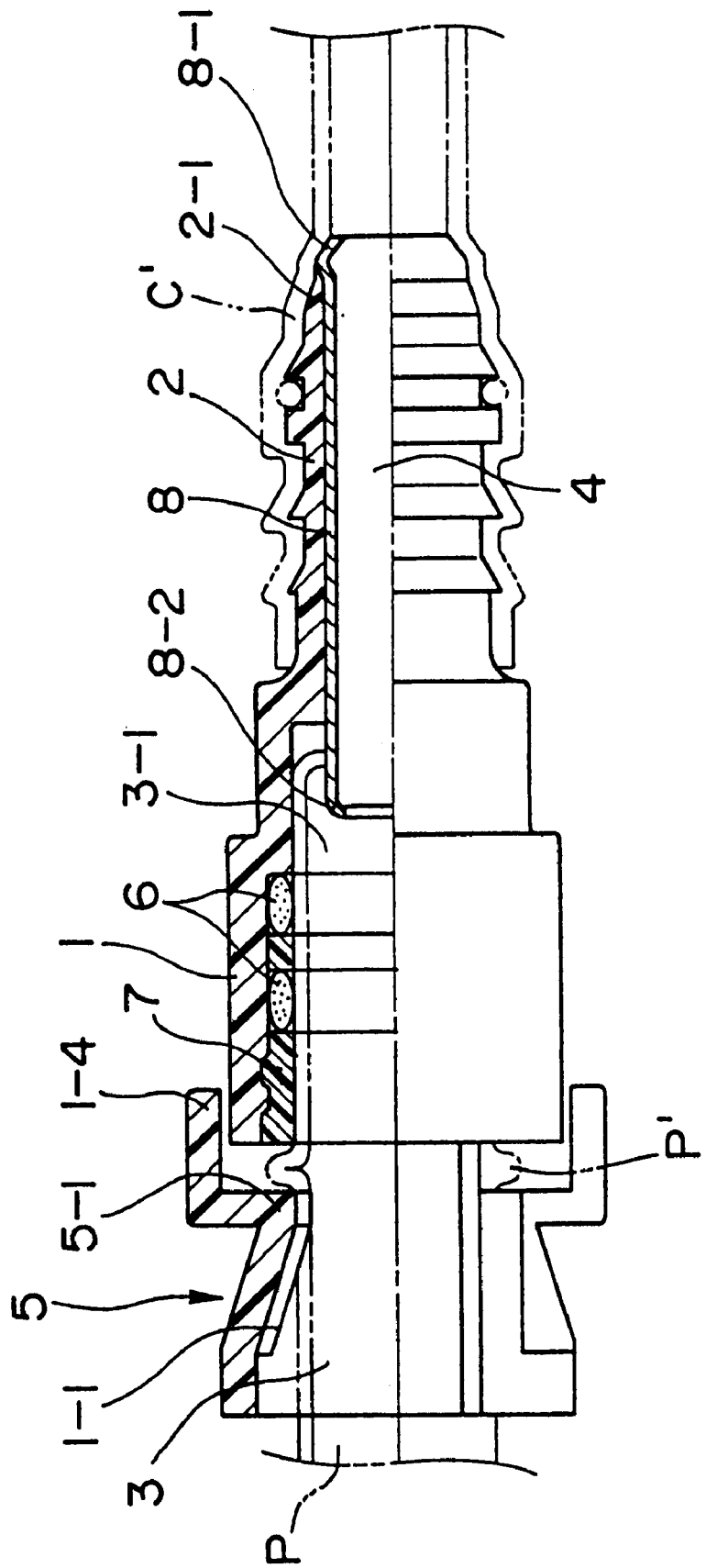

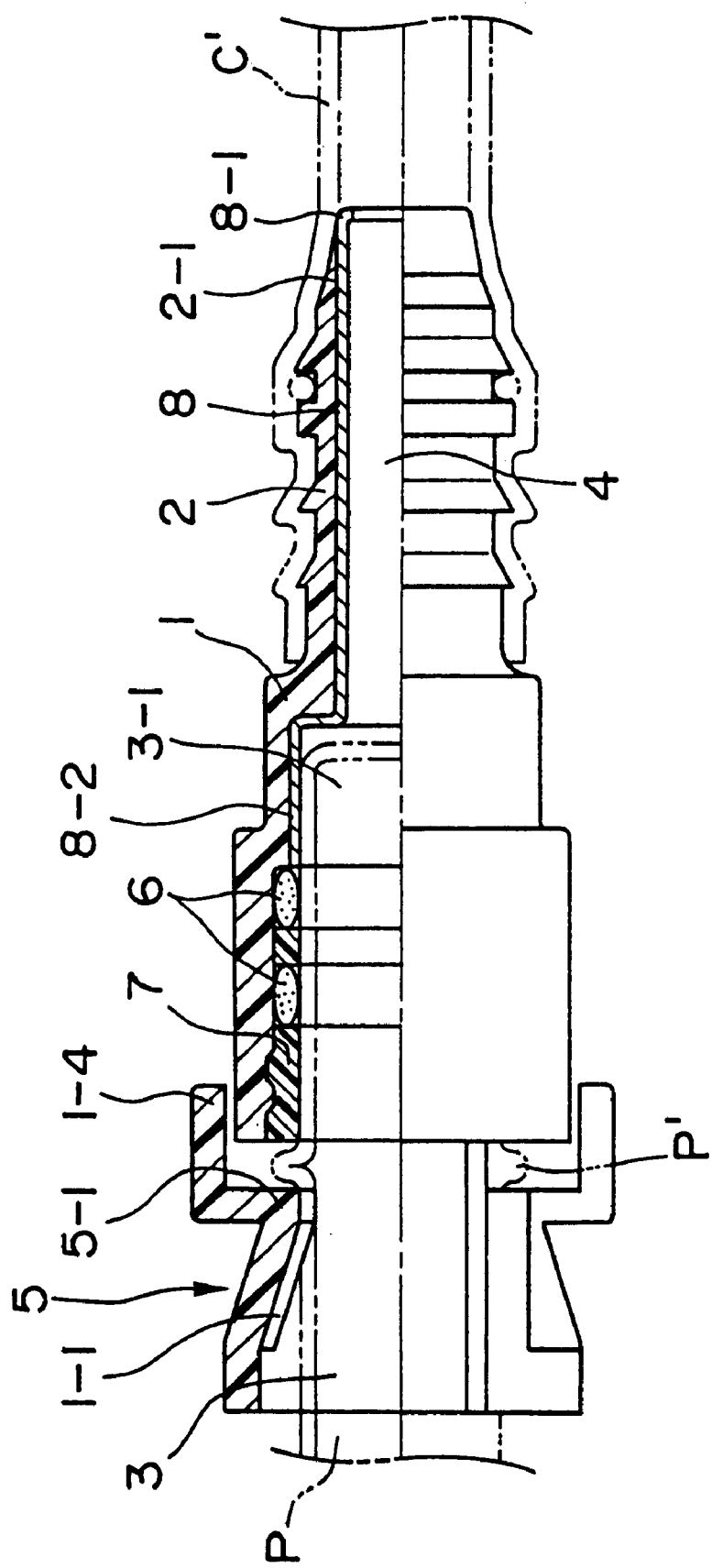

CONNECTOR MADE OF RESIN FOR CONNECTING PIPES OF SMALL DIAMETER

BACKGROUND OF THE INVENTION

1. Field of the Invention

The invention relates to a resin connector for connecting a resin tube to a metal pipe or a resin-coated metal pipe having a relatively small diameter of about 40 mm or less and generally arranged in an automotive vehicle or various kinds of machines and apparatuses as a supply passage for supplying an oil and an air, and more particularly to a resin connector for connecting a pipe having a small diameter which can improve an extraction resisting force of a resin tube inserted into a connection cylinder wall and prevent the resin tube or a resin coated layer of the resin coated metal pipe from partly breaking by discharging a static electricity.

2. Description of the Prior Arts

Conventionally, various kinds of resin quick connectors for connecting a pipe having a small diameter have been suggested and put to practical use. In an embodiment thereof, for example, as shown in FIG. 12, the structure is made such that a small diameter chamber 23-1 expanded in continuous to a communication hole 24 of a connection cylinder wall 22 provided in a front end side of a resin connector main body 21 for inserting a resin tube C" and having saw-toothed projections on an outer peripheral portion and a large diameter chamber 23 are extended through the resin connector main body 21, a seal ring member 26 and a bush member 27 are installed in a portion of the small diameter chamber 23-1 of the resin connector main body 21, an independent socket body 28 having a plurality of hook walls 25 disposed in a front portion of a peripheral wall of a center hole in an axial core in an assembling direction and inclining inward is installed in an edge portion of an engaging hole 21-1 of a hooking wall 21-2 formed by a rear end peripheral portion of the engaging hole 21-1 pierced on a peripheral wall of the large diameter chamber 23 in a state of engaging a shoulder portion 25-1 of a base portion formed by the hook walls 25 and fitting a portion of an annular peripheral wall 25-2 disposed at a rear end side thereof, and a metal pipe P0 assembled in an inner portion or an annular expansion wall P0' of a resin coated metal pipe is connected by being pressed by the hook wall 25.

Further, as another embodiment, as shown in JP-A-9-280451 (Japanese Patent Application No. 8-121063) suggested by the applicant of the present application, the structure is made such that in an inner portion of an axial core, a small diameter chamber expanded in continuous to a communication hole of a connection cylinder wall provided in a front end side of a resin connector main body for inserting a resin tube and having saw-toothed projections on an outer peripheral portion and a large diameter chamber are extended through the resin connector main body, a seal ring member and a bush member are installed in a portion of the small diameter chamber of the resin connector main body, a socket body having an elastic wall projected forward and forming a hook wall by an inward inclined bending portion near a middle portion thereof so as to be urged inward and a protruding wall extended to an outer side of a peripheral wall of the connector main body from an outer end portion of the elastic wall is provided in a notched window portion disposed at an opposing portion formed by the peripheral wall of the large diameter chamber in such a manner as to be integral with the connector main body, and a connected metal pipe or an annular expansion wall of a resin coated metal pipe is connected to the elastic wall in accordance with pressing.

Still further, as the other embodiment, as shown in Japanese Utility Model Publication No. 7-24716, the structure is made such that in an inner portion of an axial core, a small diameter chamber expanded in continuous to a communication hole of a connection cylinder wall provided in a front end side of a resin connector main body for inserting a resin tube and having saw-toothed projections on an outer peripheral portion and a large diameter chamber are extended through the resin connector main body, a seal ring member and a bush member are installed in a portion of the small diameter chamber of the resin connector main body, an engaging hole is pierced on a peripheral wall of the large diameter chamber, and an independent socket body comprises an annular portion having an outer diameter substantially equal to an inner diameter of the small diameter chamber of the connector main body and an inner diameter substantially equal to an outer diameter of a metal pipe or a resin coated metal pipe and a plurality of elastic walls each having a projection extended from the annular portion and projected to an outer side of the middle portion and a notch notched at an inner side of the middle portion.

Then, the structure is made such as to insert the socket body within the small diameter chamber from the side of the annular portion via the large diameter chamber of the connector main body, press the notch provided on the elastic wall in such a manner as to be held in the metal pipe or the annular expanded wall of the resin coated metal pipe and fit the projection provided on the outer side of the elastic wall to the engaging hole provided on the peripheral wall of the expanded chamber in the connector main body, thereby connecting the metal pipe or the resin coated metal pipe to the connector main body.

However, in all of the conventional embodiments, when the extraction force is applied to the resin tube inserted into the connection cylinder wall of the resin connector main body, particularly under a heated circumstance, there is a case that the resin tube is extracted from the connector main body.

Then, in the case of the resin tube having a tendency of being easily extracted, it is unavoidable to fasten by a fastening band from the outer periphery of the inserted resin tube in order to prevent this, and accordingly a lot of labors are necessary for this operation, so that an improvement thereof has been desired.

It is not clear why the resin tube is easily extracted from the connection cylinder wall of the resin connector main body, particularly under a heated circumstance as mentioned above, however, it is estimated as follows, and this estimation will be described below with reference to FIG. 13.

That is, when an extracting force F is applied to the resin tube, at the same time of extending in an axial direction, the outer diameter and the inner diameter of the resin tube is shortened, so that a force f1 for pressing the connection cylinder wall in the side of the front end of the resin connector main body from the outer portion in a diametrical direction is applied thereto. On the contrary, a force f2 is applied to the inner peripheral surface of the connection cylinder wall from the inner portion in a diametrical direction in such a manner as to stand against the force f1, however, since the connection cylinder wall is thin, a sufficient opposing force f2 can not generated, so that the diameter of the connection cylinder wall is shortened due to the pressing force f1 and a friction force between the inner surface of the resin tube and the outer surface of the connection cylinder wall is lowered. Accordingly, it is felt that the resin tube becomes easily extracted.

Particularly, under the heated circumference, since a whole of the resin connector is softened, a rigidity is lowered and the opposing force f2 in the connection cylinder wall is generated at a significantly little amount, the tendency mentioned above becomes further significant.

Then, in order to improve the extraction resisting force of the resin tube, it has been considered that the connection cylinder wall of the connector main body is made thick, however, an inner diameter of the connection cylinder wall of the connector main body (that is, a diameter of the communication passage) d2 corresponds to a portion formed in a particular small inner diameter within all the pipe path, so that it is desired to make the inner diameter d2 as large as possible in order not to make a pressure loss of a fluid passing through the portion large.

Further, since it is hard to insert and assemble the resin tube when setting an outer diameter D2 of the connection cylinder wall large, it is desired to make it as small as possible.

Due to the limiting conditions of the inner diameter and the outer diameter of the connection cylinder wall as mentioned above, it has been impossible to make the connection cylinder wall thick.

Further, in the case of inserting and connecting the resin tube to the connector for resin pipe having a small diameter and using it to a fuel pipe system, the following problems existed.

That is, when a fuel such as a gasoline passes within the fuel pipe system, a static electricity is generated due to a fluid friction with respect to the inner wall surface of the pipe or a fluid friction with respect to a filter in the flow passage. On the contrary, a connecting connector used for connecting an engine side pipe and a fuel tank side pipe to the resin tube and connecting each of the resin tubes to the fuel pipe has an insulating characteristic because it is formed by a resin material, the resin tube used for the fuel pipe system has an insulating characteristic because it is constituted by a rubber tube or a nylon tube, and further, in the case of employing the resin coated metal pipe, the resin coated layer applied to the outer peripheral surface has an insulating characteristic. Accordingly, a static electricity generated due to the fluid friction with respect to the inner wall surface of the pipe or the fluid friction with respect to the filter in the flow passage as mentioned above is not discharged in the connecting connector, the resin tube and the resin coated layer of the resin coated metal pipe but is still charged.

In this case, the rubber tube used as the resin tube generally has a thickness of about 3 mm, and the nylon tube has a thickness of about 1 mm.

Then, the static electricity generated due to the fluid friction with respect to the inner wall surface of the pipe as mentioned above is gradually charged without being discharged because an insulating material is employed for the part constituting the fuel pipe system, and generates a spark at a nearest portion to a vehicle body on an outer peripheral surface of a thin portion of the resin tube or the resin coated layer of the resin coated metal pipe when reaching 1000 V or more, and the resin tube or the resin coated layer is partly broken by this spark. This broken portion forms a pin hole, and a damage of the resin tube or the metal pipe is partly begun from the pin hole portion.

SUMMARY OF THE INVENTION

The invention is made by taking the problems in the prior art mentioned above into consideration, and an object of the invention is to provide a resin connector for connecting a pipe having a small diameter which can improve an extraction resisting force of a resin tube inserted to a connection cylinder wall of a connector main body, particularly at a time of being used under a heated circumstance and effectively discharge a static electricity so as to prevent a resin tube or a resin coated layer of a resin coated metal pipe from partly breaking.

In order to achieve the object mentioned above, in accordance with the invention, there is provided a resin connector for connecting a pipe having a small diameter structured such that in an inner portion of an axial core, a small diameter chamber expanded in continuous to a communication hole of a connection cylinder wall provided in a front end side of a resin connector main body for inserting a resin tube and a large diameter chamber are extended through the resin connector main body, a seal ring member and a bush member are installed in a portion of the small diameter chamber of the resin connector main body, a socket body having a plurality of elastic walls are provided in an engaging hole portion or a notched window portion disposed at an opposing portion formed by the peripheral wall of the large diameter chamber in such a manner as to be independent from or integral with the connector main body, and the elastic wall is pressed and connected to an annular expansion wall portion in a side of a metal pipe or a resin coated metal pipe to be connected, wherein a support member is inwardly fitted to an inner peripheral surface of the connection cylinder wall so as to improve a rigidity of the connection cylinder wall from an inner side. In this case, the structure may be made such that the support member is constituted by a cylinder body, a partly-notched circular cylinder body, a corrugated cylinder body, a cylinder body having a bulge or a spool at an end, a cylinder body having an enlarged diameter portion at an end or a spiral spring body, while being constituted by a conductive material, and a free end in a side of a front end of the support member is extended outward from a front end portion of an opening in the connection cylinder wall so as to be in contact with an inner peripheral surface of the resin tube made of a conductive resin material and be held to or in contact with a metal skin surface of the metal pipe or the resin coated metal pipe to which a free end in a side of a rear end is connected at a fine interval, or that in the resin coated metal pipe obtained by coating an outer peripheral surface of the metal pipe with a resin layer, an exposed metal skin surface obtained by stripping off the resin coated layer from the front end side to the annular expanded wall portion at the longest is brought into contact with the free end in the rear end side of the support member.

BRIEF DESCRIPTION OF THE DRAWINGS

FIG. 1 is a half sectional view which shows a connection state of an embodiment of a resin connector for connecting a pipe having a small diameter in accordance with the invention;

FIGS. 2A and 2B are views showing an embodiment of a support member used in the embodiment shown in FIG. 1, in which FIG. 2A is a front elevational view and FIG. 2B is a side elevational view;

FIGS. 3A and 3B are views showing another embodiment of a support member used in the embodiment shown in FIG. 1, in which FIG. 3A is a front elevational view and FIG. 3B is a side elevational view;

FIGS. 4A and 4B are views showing the other embodiment of a support member used in the embodiment shown in FIG. 1, in which FIG. 4A is a front elevational view and FIG. 4B is a side elevational view;

FIG. 5 is a half sectional view which shows a connection state of another embodiment of a resin connector for connecting a pipe having a small diameter in accordance with the invention;

FIGS. 6A and 6B are views showing an embodiment of a support member used in the embodiment shown in FIG. 5, in which FIG. 6A is a front elevational view and FIG. 6B is a side elevational view;

FIG. 7 is a half sectional view which shows a connection state of the other embodiment of a resin connector for connecting a pipe having a small diameter in accordance with the invention;

FIGS. 8A and 8B are views showing an embodiment of a support member used in the embodiment shown in FIG. 7, in which FIG. 8A is a front elevational view and FIG. 8B is a side elevational view;

DETAILED DESCRIPTION OF PREFERRED EMBODIMENTS

Figure 2A:
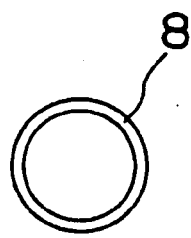

In the invention, reference numeral 1 denotes a main body as a resin connector, which has a small diameter chamber 3-1 formed in continuous to a communication hole 4 of a connection cylinder wall 2 provided for inserting a resin tube C projected from a front end side and having saw-toothed projections on an outer peripheral portion thereof in an expanded manner and a large diameter chamber 3 disposed at the back of the small diameter chamber, these chambers being provided within an axial core of the connector with being extended therethrough. In this structure, an elastic seal ring member 6 and a cylindrical bush member 7 which are made of a rubber material or a resin material are installed in the small diameter chamber 3-1 portion.

Further, in a notched window 1-1 portion provided in an opposing portion formed by a peripheral wall in the side of the large diameter chamber 3, a socket body 5 having an elastic wall 1-2 for inwardly urging a outward bending portion projected forward and inclined inward near a middle portion with respect to a hook wall 5-1 and a projecting wall 1-4 extended forward from an outer end portion of the elastic wall in a direction of the axial core is integrally formed with the peripheral wall of the connector main body 1, however, the projecting wall 1-4 may be omitted.

Then, at a time of connecting the metal pipe or the resin coated metal pipe P to the resin connector main body 1 having the structure mentioned above, a front end portion of the metal pipe P is inserted into the enlarged diameter chamber 3 of the connector main body 1, the elastic wall 1-2 is outwardly expanded by an annular expanded wall P' provided near the connection end portion of the metal pipe P and an inserting operation is further continued, whereby the elastic wall 1-2 is returned to an original position due to an elastic force and the hook wall 5-1 is engaged with the annular expanded wall P' after the annular expanded wall P' is passed, so that a connection is completed.

Figure 2B:
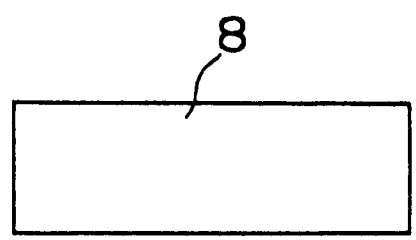
Figure 3A:
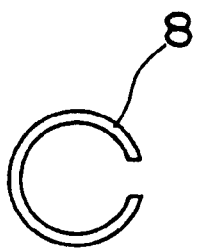
Figure 3B:
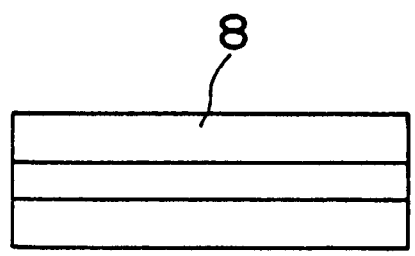
Figure 4A:
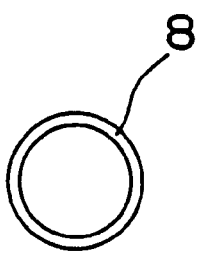
Figure 4B:
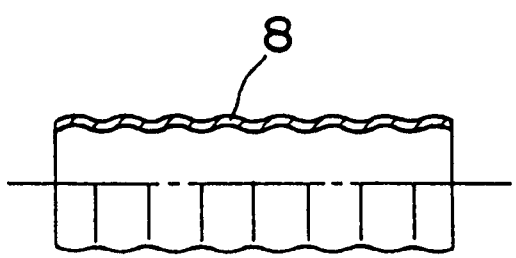

Next, reference numeral 8 denotes a support member inwardly fitted on an inner peripheral surface of the connection cylinder wall 2 and provided in such a manner as to improve a rigidity of the connection cylinder wall 2 from the inner side, which is formed as a cylinder body shown in FIGS. 2(a) and 2(b), a notched circular cylinder body shown in FIGS. 3(a) and 3(b) or a corrugated cylinder body shown in FIGS. 4(a) and 4(b), preferably made of a metal, for example, a conductive material such as an iron, a stainless steel, a copper, a brass or an aluminum alloy, and preferably has a thickness of about 0.2 to 1.0 mm.

Figure 13:
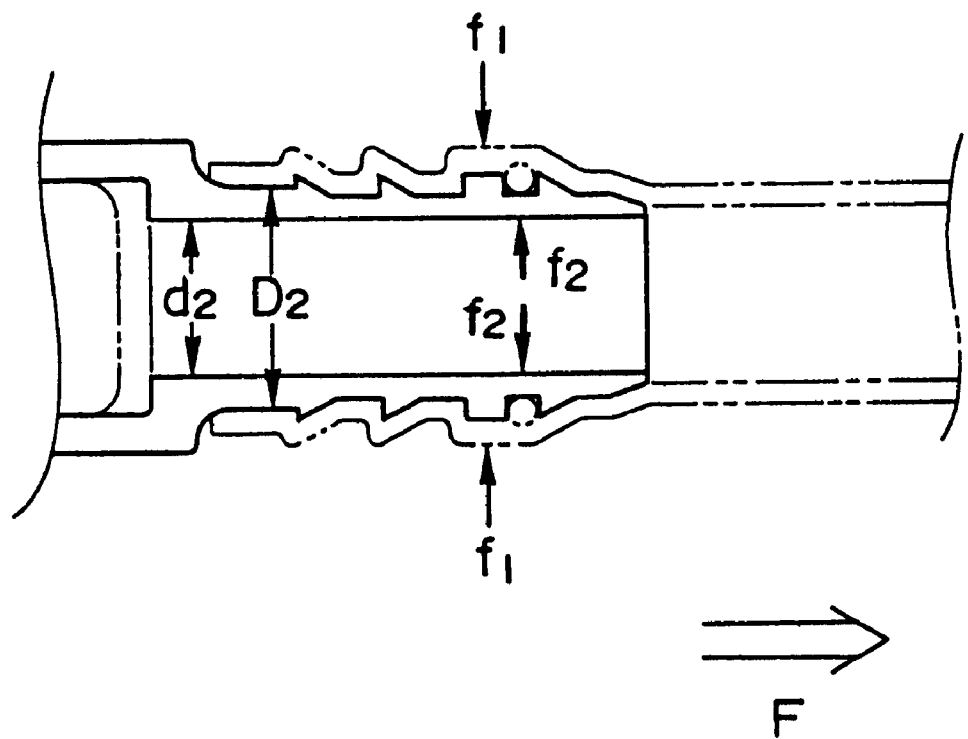
FIG. 13 is a schematic view which explains a state of applying an extraction force to a resin tube.

In accordance with the invention, since the support member 8 mentioned above is inwardly fitted to the inner peripheral surface of the connection cylinder wall 2, it is possible to improve a rigidity without increasing a thickness of the connection cylinder wall 2, so that it is possible to maintain a rigidity for maintaining an outer diameter of the connection cylinder wall 2 shown in FIG. 13 in a value substantially equal to that at a normal temperature particularly even under a heated circumstance at about 100° C. as well as in use at a normal temperature, thereby increasing an extraction resisting force of the resin tube C.

Next, a description will be given of an embodiment provided with conductive means which effectively discharges a static electricity generated by a fluid friction with respect to an inner wall surface of the tube or a fluid friction with respect to a filter within a flow passage as well as increases an extraction resisting force with respect to the resin tube C mentioned above with using the support member 8 mentioned above so as to prevent the resin tube C and the resin coated layer of the resin coated metal pipe having the resin coated layer on the outer peripheral surface from partly breaking with reference to FIGS. 5 to 11.

In this case, in the embodiment shown in FIGS. 5 to 11, it is necessary to form the resin tube as a conductive tube C', so that a formation is performed by mixing a metal powder or a fiber having a conductivity such as a copper, a brass and a silver, or a powder or a fiber of a carbon and the like to a thermoplastic resin so as to obtain a conductivity, and it is possible to use a resin composite tube disclosed in Japanese Patent Unexamined Publication No. 3-69887 suggested by the applicant of the present application as occasion demands.

Then, in these embodiments, the support member 8 is formed with the same material and thickness as those of the embodiment mentioned above, the structure is made such as to extend a free end 8-1 in a side of the front end thereof outward from the front end portion 2-1 of the opening of the connection cylinder wall 2 so as to be brought into contact with the inner peripheral surface of the conductive resin tube C'. Further, in order to discharge a static electricity generated by holding or contacting a fine interval with respect to a skin surface of the metal pipe P connected to the rear end side free end 8-2, in FIG. 5, a bulge or a spool is formed in the front end side free end 8-1 so as to be in contact with the inner peripheral surface of the conductive resin tube C', while the diameter of the rear end side free end 8-2 is shortened so as to be inserted within the opening portion in the front end side of the metal pipe P, thereby preferably bringing into contact with the skin surface of the metal pipe P.

Figure 6A:
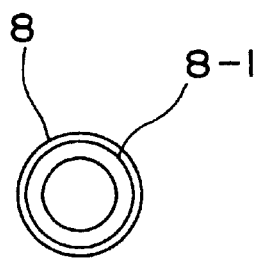
Figure 6B:
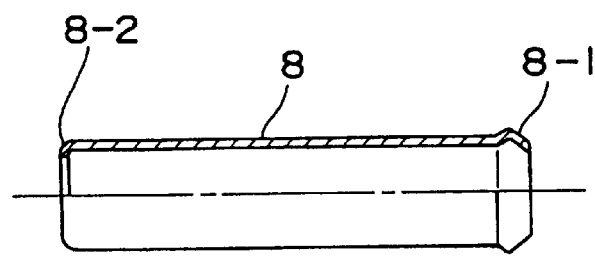
Figure 8A:
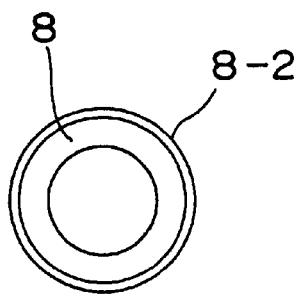
Figure 8B:
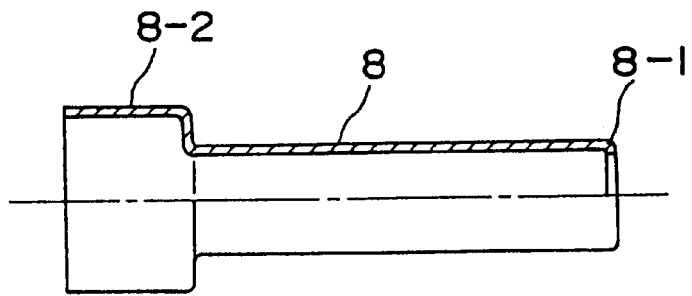

In this case, the support member 8 illustrated in FIGS. 6(a) and 6(b) and used in the embodiment shown in FIG. 5 is assembled in the connection cylinder wall 2 by inserting the rear end side free end 8-2 from the opening front end portion 2-1 of the connection cylinder wall 2 and inwardly fitting until the bulge portion of the front end side free end 8-1 is brought into contact with the opening front end portion 2-1.

Further, in FIG. 7, it is structured such that a diameter of the front end side free end 8-1 is shortened so as to bring the front end side free end 8-1 of the support member 8 extended outward from the opening front end portion 2-1 of the connection cylinder wall 2 into contact with the inner peripheral surface of the conductive resin tube C' while a diameter of the rear end side free end 8-2 is enlarged so as to bring the rear end side free end 8-2 into contact with the inner peripheral surface of the small diameter chamber 3-1 of the connector main body 1, thereby holding a fine interval between the outer skin surface of the metal pipe P to be connected and the inner peripheral surface of the rear end side free end 8-2 or preferably contacting the two. Then, the support member 8 illustrated in FIGS. 8(a) and 8(b) and used in the embodiment shown in FIG. 7 is assembled in the connection cylinder wall 2 by inserting the front end side free end 8-1 from the expanded diameter chamber 3 side of the connector main body 1 and inwardly fitting until the expanded diameter portion of the rear end side free end 8-2 is brought into contact with the small diameter chamber 3-1.

Figure 12:
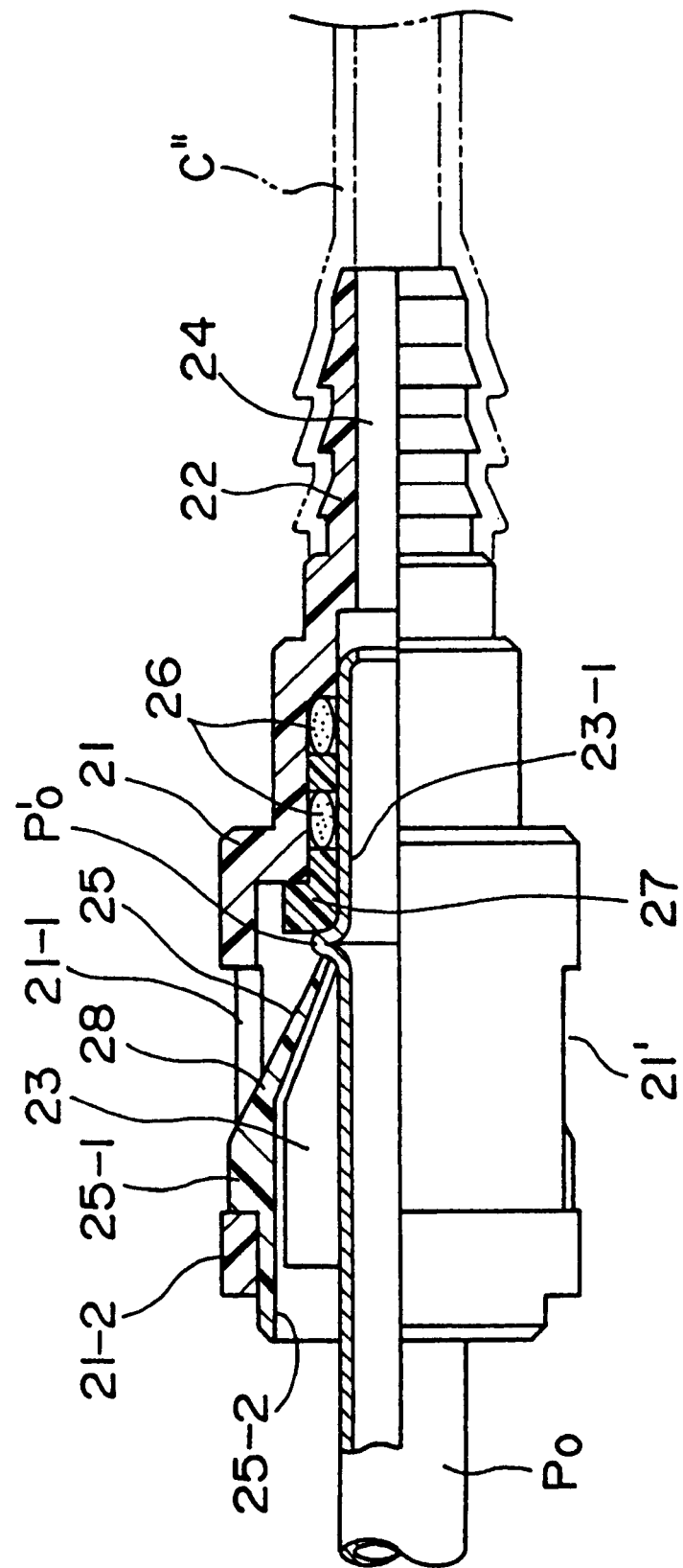
FIG. 12 is a half sectional view which shows a connection state of a conventional resin connector for connecting a pipe having a small diameter in accordance with the invention.

Also, since the invention can achieve the effect mentioned above only by inwardly fitting the support member 8 within the connection cylinder wall 2 of the resin connector main body 1 for connecting the pipe having a small diameter, the invention can be easily applied not only to the resin connector for connecting the pipe having a small diameter shown in FIGS. 1 to 8 but also to the conventional known resin connector for connecting the pipe having a small diameter as shown in FIG. 12, so that the same operation and effect can be obtained.

Figure 9:
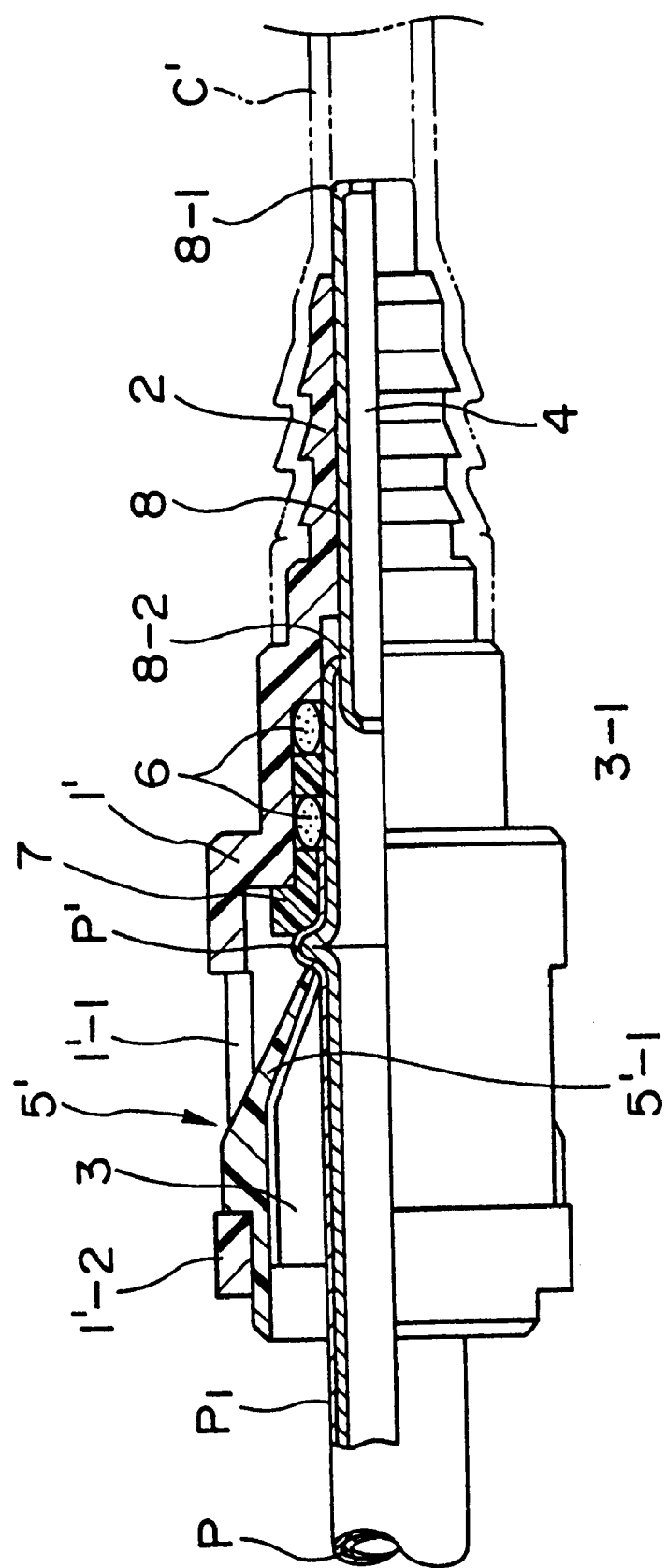
FIG. 9 is a half sectional view which shows a connection state of further the other embodiment of a resin connector for connecting a pipe having a small diameter in accordance with the invention.

Here, a description will be given of an embodiment in which the invention is applied to the resin connector for connecting the pipe having a small diameter of the type shown in FIG. 12 and the resin coated metal pipe P having an outer peripheral surface coated by the resin coated layer P1 with reference to FIG. 9. In this embodiment, the resin connector main body 1' has a small diameter chamber 3-1 formed in continuous to a communication hole 4 of a connection cylinder wall 2 provided for inserting a conductive resin tube C' in a front end side and having saw-toothed projections on an outer peripheral portion thereof in an expanded manner and a large diameter chamber 3, these chambers being provided with being extended therethrough. In this structure, the seal ring member 6 and the bush member 7 are installed in the small diameter chamber 3-1 portion. Further, in an edge portion of an engaging hole 1'-1 of an engaging wall 1'-2 formed by a rear end peripheral portion of the engaging hole 1'-1 pierced on the peripheral wall of the large diameter chamber 3, an independent socket body 5' having a plurality of hook walls 5'-1 disposed in a front portion in a direction of assembling the peripheral wall of the axial core central hole and inclined inward is installed by inserting the annular peripheral wall portion in the rear end side thereof with engaging a shoulder portion of a base portion formed by the hook walls 5'-1. Still further, a connection is performed by pressing and engaging the annular expanded wall P' of the resin coated metal pipe P having a resin coated layer P1 on an outer peripheral surface assembled therewithin by the hook walls 5'-1.

In addition, in order to apply a conductivity to the resin coated metal pipe P, the resin coated layer P1 from the front end side to the annular expanded wall P' at the longest is stripped by a buff abrasion by means of a wire buff or a cutting as usual, however, it is preferable to employ a method of pressing the resin coated layer P1 by the pressing means for inwardly pressing in a diametrical direction from the outer portion and relatively moving the metal pipe P and the pressing means in a peripheral direction so as to strip as described in Japanese Patent Application No.9-257689 filed by the applicant of the present application.

Then, the structure is made such that the generated static electricity can be effectively discharged by inwardly fitting the support member 8 to the inner peripheral surface of the connection cylinder wall 2 of the resin connector 1' for connecting the pipe having a small diameter structured in the above manner so as to bring the front end side free end 8-1 of the support member into contact with the conductive resin tube C', while holding a fine interval between the metal skin surface exposed by stripping the resin coated layer P1 of the resin coated metal pipe P by the means mentioned above and the rear end side free end 8-2 of the support member 8 or preferably contacting the two.

Figure 10:
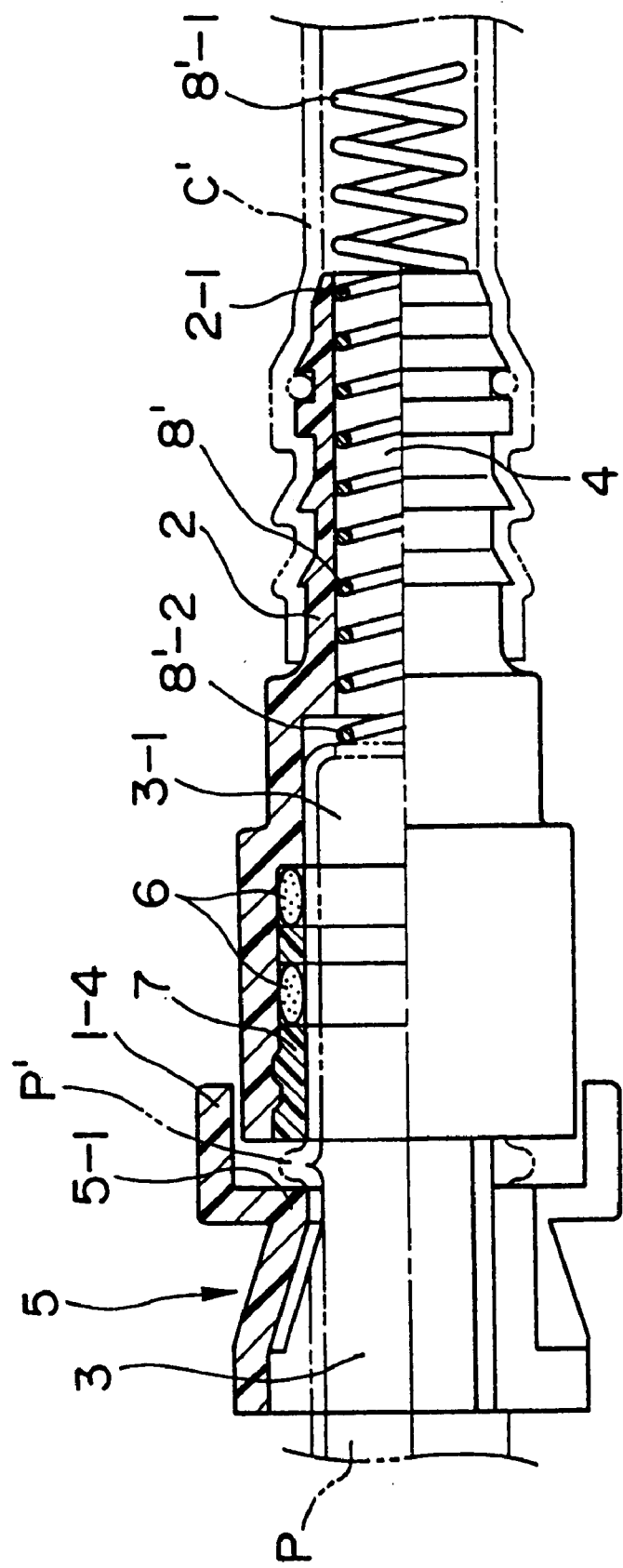
FIG. 10 is a half sectional view which shows a connection state of still further the other embodiment of a resin connector for connecting a pipe having a small diameter in accordance with the invention.
Figure 11:
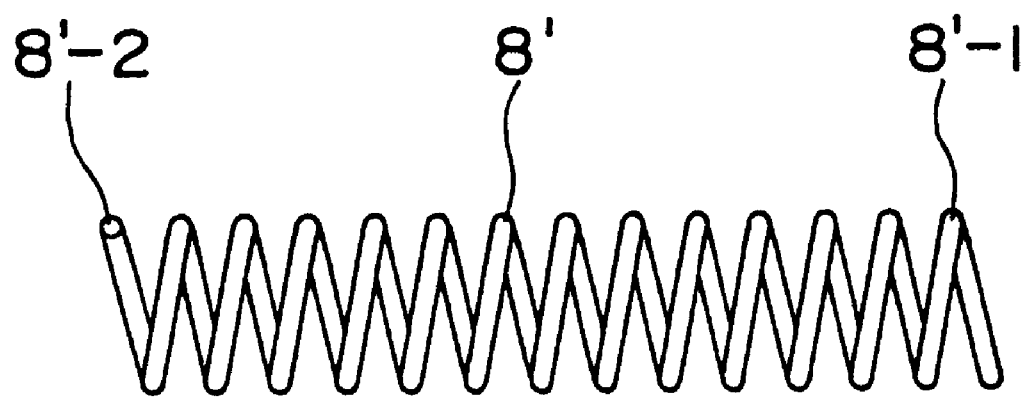
FIG. 11 is a side elevational view which shows an embodiment of a support member used in the embodiment shown in FIG. 10.

Further, in the embodiment shown in FIG. 10, the support member 8 is constituted by a spiral spring body 8' as shown in FIG. 11 and made of a conductive metal having a little elasticity such as a phosphor bronze wire having a wire diameter of about 0.3 to 3.0 mm, a galvanized steel wire having a spring characteristic or a stainless steel wire controlled to a spring, and is inwardly fitted within the connection cylinder wall in such a manner as to be closely attached to the communication hole 4 of the connection cylinder wall 2 so as not to be displaced in an axial direction due to a vibration of a whole, a flow resistance of an inner fluid and an axial vibration of the metal pipe P. The front end side free end 8'-1 thereof is outwardly extended from the opening front end portion 2-1 of the connection cylinder wall 2 so as to be brought into contact with the inner peripheral surface of the conductive resin tube C' while holding a fine interval between the metal skin surface of the front end portion in the metal pipe P to be connected and the rear end side free end 8'-2 or preferably contacting the two.

Since the spiral spring body 8' used in the embodiment as the support member has a little smaller force for supporting the connection cylinder wall 2 from the inner side in comparison with the support member 8 constituted by the cylinder body, the notched circular cylinder body, the corrugated circular body, the cylinder body having a bulge or a spool at an end or the cylinder body having the expanded diameter portion at an end shown in the respective embodiments mentioned above, an extraction resisting force of the resin tube C or the conductive resin tube C' is a little smaller, however, the spiral spring body has a flexibility. Accordingly, the spiral spring body can deform in response to a bending deformation of the resin tube, and does not generate a stress concentration near the opening front end portion 2-1 of the connection cylinder wall 2 in the resin tube. Further, since there is a flexibility with respect to a contact with the front end portion of the connected metal pipe or the resin coated metal pipe P, it is possible to prevent a fretting friction phenomenon with respect to the metal pipe. Still further, since the spiral spring body is formed in a spiral shape, another operation and effect that a rectifying action against the fluid flowing through the inner portion can be obtained can be achieved.

As mentioned above, in accordance with the embodiment shown in FIGS. 5 to 11, since the metal pipe or the resin coated metal pipe P and the conductive resin tube C' are connected to each other by the support member 8 or the spiral spring body 8' in a conductive relation, the static electricity generated due to the fluid friction with respect to the wall surface within the pipe or the fluid friction with respect to the filter within the fluid passage can be discharged to a side of an engine or a side of a tank so as to spark from a part of the resin tube or the resin coated layer of the resin coated metal pipe to the side of the vehicle body, thereby preventing the resin tube or the resin coated layer of the resin coated metal pipe from breaking.

In addition, the support member shown in FIGS. 1 to 4 can be used as a structure commonly having the conductive means shown in FIGS. 5 to 11 when a total length thereof is extended so as to extend both end portions thereof from both end portions of the connection cylinder wall and the resin tube is replaced by the conductive resin tube. Also, it is needless to say that the support member commonly having the conductive effect in FIGS. 5 to 11 can be used in the embodiment shown in FIGS. 1 to 4 as a simple support member by shortening the total length thereof so as to be received within the connection cylinder wall as occasion demands.

EXAMPLES

Next, in order to establish an increase of an extraction resisting force of the resin tube, an embodiment of the invention will be described below.

At first, there is prepared four connector main bodies having a shape shown in FIG. 1, which is made of a resin material obtained by mixing 23 weight % of glass fiber to PA12, has a length of 23 mm and an inner diameter of 7.5 mm and integrally forms a connection cylinder wall having a saw-toothed projection having a bottom outer diameter of 9.9 mm and a top outer diameter of 11.7 mm on an outer peripheral portion.

Next, a sample A is obtained by inserting a resin tube constituted by PA11 (7% of plasticizer is mixed) and having an outer diameter of 10.8 mm, an inner diameter of 8.8 mm and a thickness of 1 mm to the connection cylinder walls of two connector main bodies, a sample B is obtained by inserting the same resin tube as mentioned above to the inner peripheral surface of the connection cylinder wall after inwardly fitting a support member made of iron and having an outer diameter of 7.5 mm, an inner diameter of 6.6 mm, a thickness of 0.45 mm and a length of 23 mm as to the remaining two connector main bodies, and an extraction test is performed with respect to each of the samples under a normal temperature and a heated circumstance at 125° C. so as to measure an average value (newton: N) of a maximum extraction load until the resin tube is extracted. Results are shown in the following Table 1.

TABLE 1

| Sample | Normal Temperature | 125 ° C. |
|---|---|---|
| A | 903N | 243N |
| B | 947N | 298N |

As is understood from Table 1, in the sample B inwardly fitting the support member to the inner peripheral surface of the connection cylinder wall, the extraction resisting force of the resin tube is 4.9% improved at the normal temperature in comparison with the sample A having no support member, however, is 22.6% improved under the heated circumstance at 125° C.

As mentioned above, in accordance with the invention, there can be provided a resin connector for connecting a pipe having a small diameter which can improve an extraction resisting force of the resin tube inserted to the connection cylinder wall of the resin connector main body particularly in a use under a heated circumstance as well as at a normal temperature, requires no fastening band in some cases and can discharge a static electricity generated by a fluid friction with respect to the inner wall surface of the pipe or a fluid friction with respect to the filter in the fluid passage to the engine side or the tank side so as to prevent the resin tube or the resin coated layer of the resin coated metal pipe from being partly broken due to a spark from the resin tube or the resin coated layer to the side of the vehicle body.

Further, in accordance with the invention, since a flexibility can be obtained by forming the support member by the spiral spring body, the support member can be deformed in response to the bending displacement of the resin tube and a stress concentration is not generated within the resin tube. Still further, since there is a flexibility in a contact with the front end portion of the connected metal pipe or the resin coated metal pipe, a fretting friction phenomenon with respect to the metal pipe can be prevented. Furthermore, since the support member is formed in a spiral shape, a rectifying effect against the fluid flowing through the inner portion can be obtained.

What is claimed is:

1. A connector for connecting a metal pipe to a conductive resin tube, said metal pipe having an end and an annular expansion wall in proximity to said end, said conductive resin tube having an inner circumferential surface, said connector comprising:

a connector main body formed from resin and having opposite front and rear ends, a connection cylinder wall extending from the front end toward the rear end and dimensioned for insertion into the conductive resin tube, the connection cylinder wall having a communication hole extending axially therethrough and having an inner peripheral surface, a small diameter chamber between the connection cylinder wall and the rear end of the connector main body, the small diameter chamber communicating with the communication hole and being dimensioned for slidably receiving portions of the metal pipe between the end and the annular expansion wall, a large diameter chamber extending from the small diameter chamber to the rear end of the connector main body, the large diameter chamber defining a socket body having a plurality of elastic walls dimensioned and configured for engaging said annular expansion wall of said metal pipe when portions of said metal pipe adjacent said end are inserted in said small diameter chamber;

a seal ring and a bush installed in said small diameter chamber for surrounding portions of said metal pipe when said pipe end of said metal pipe is inserted into said small diameter chamber; and a support member having opposite front and rear ends, portions of said support member between said ends being fitted to the inner peripheral surface of said connection cylinder wall for improving rigidity of said connection cylinder wall from an inner side, portions of said support member adjacent said front end projecting beyond said front end of said connector main body and contacting said inner circumferential surface of said conductive resin tube, said rear end of said support member projecting into said small diameter chamber and said metal pipe.

2. The connector of claim 1, wherein said support member is a configuration selected from the group consisting of a cylinder body, a partly-notched circular cylinder body, a corrugated cylinder body, a cylinder body having a bulge at an end and a cylinder body having an enlarged diameter portion at an end.

3. The connector of claim 2, wherein said support member is formed from a conductive metal.

4. The connector of claim 3, wherein the conductive metal of the support member is selected from the group consisting of iron, stainless steel, copper, brass and aluminum alloy.

5. The connector of claim 2, wherein said support member has a thickness of about 0.2 to 1.0 mm.

6. The connector of claim 1, wherein said support member comprises a spiral spring body.

7. The connector of claim 6, wherein said support member is made of a conductive metal selected from the group consisting of a phosphor bronze wire, a galvanized steel wire and a stainless steel wire.

8. The connector of claim 6, wherein said support member has a wire diameter of about 0.3 to 3.0 mm.

9. The connector of claim 1, wherein said conductive tube is formed by mixing a conductive material with a thermoplastic resin, said conductive material being selected from the group consisting of metal powder, a fiber of copper, a fiber of brass, a fiber of silver, a powder of carbon and a fiber of carbon.

10. The connector of claim 1, wherein the metal pipe comprises a resin coating on an outer peripheral surface of said metal pipe, an exposed metal skin surface being obtained on the pipe by stripping off the resin from the end of the metal pipe to the annular expanded wall portion for contact with the rear end of said support member.

* * * * *